(12) United States Patent
Lo et al.

(10) Patent No.: US 11,721,224 B2
(45) Date of Patent: Aug. 8, 2023

(54) DRONE APPARATUS AND METHOD FOR DEPLOYING DRONE WORKING ZONE

(71) Applicant: Industrial Technology Research Institute, Hsinchu (TW)

(72) Inventors: Chao-Cheng Lo, Changhua County (TW); Yi-Lun Wen, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 363 days.

(21) Appl. No.: 17/121,761

(22) Filed: Dec. 15, 2020

(65) Prior Publication Data

US 2022/0148444 A1    May 12, 2022

(30) Foreign Application Priority Data

Nov. 6, 2020   (TW) .................................. 109138934

(51) Int. Cl.
*G08G 5/00* (2006.01)
*B64U 101/00* (2023.01)
(Continued)

(52) U.S. Cl.
CPC ......... *G08G 5/0047* (2013.01); *B64C 39/024* (2013.01); *G08G 5/003* (2013.01); *H04W 4/80* (2018.02); *B64U 2101/00* (2023.01)

(58) Field of Classification Search
None
See application file for complete search history.

(56) References Cited

U.S. PATENT DOCUMENTS

| 9,056,669 B2 | 6/2015 | Washington et al. |
| 9,552,736 B2 | 1/2017 | Taveira |

(Continued)

FOREIGN PATENT DOCUMENTS

| CN | 108227730 | 6/2018 |
| CN | 207518753 | 6/2018 |

(Continued)

OTHER PUBLICATIONS

"Office Action of Taiwan Counterpart Application", dated Jan. 18, 2022, p. 1-p. 4.

(Continued)

*Primary Examiner* — Peter D Nolan
*Assistant Examiner* — Jacob Kent Besteman-Street
(74) *Attorney, Agent, or Firm* — JCIPRNET

(57) ABSTRACT

A drone apparatus and a method for deploying a drone working zone are provided. The drone apparatus includes an aircraft body, a communication device, a positioning device and a flight controller. The flight controller is configured to: set edge rules of a working zone unit used to construct a working zone for the drone apparatus to work around a bridge; control the aircraft body to fly along a target section selected in the bridge according to a control signal received by the communication device, and calculate positions of multiple points of interest (POIs) passed by during the flight using the positioning device; generate one working zone unit with positions of adjacent two of the POIs according to the edge rules of the working zone unit; and combine multiple working zone units generated by using positions of all the POIs to construct and deploy the working zone of the target section.

16 Claims, 5 Drawing Sheets

(51) Int. Cl.
    H04W 4/80      (2018.01)
    B64C 39/02     (2023.01)

(56) References Cited

U.S. PATENT DOCUMENTS

| | | | |
|---|---|---|---|
| 9,858,822 | B1 | 1/2018 | Gentry |
| 9,905,134 | B2 | 2/2018 | Kube et al. |
| 10,535,274 | B2 | 1/2020 | Mere |
| 10,679,510 | B2 | 6/2020 | Gong et al. |
| 2016/0111006 | A1 | 4/2016 | Srivastava et al. |
| 2017/0323572 | A1 | 11/2017 | Chan et al. |
| 2018/0122246 | A1* | 5/2018 | Clark .......... G05D 1/0094 |
| 2018/0281948 | A1 | 10/2018 | Tao et al. |
| 2019/0130768 | A1* | 5/2019 | Clark .......... G08G 5/0086 |
| 2019/0139424 | A1 | 5/2019 | Shay |
| 2020/0043348 | A1 | 2/2020 | Ghosh et al. |

FOREIGN PATENT DOCUMENTS

| | | |
|---|---|---|
| CN | 109444171 | 3/2019 |
| CN | 109612427 | 4/2019 |
| JP | 2018119970 | 8/2018 |
| TW | 201704099 | 2/2017 |
| TW | I657011 | 4/2019 |

OTHER PUBLICATIONS

Sunan Huang et al., "Distributed cooperative collision avoidance control and implementation for multi-unmanned aerial vehicles", 2017 11th Asian Control Conference (ASCC), Dec. 2017, pp. 222-227.
Siyuan Peng et al., "Fast 3D Map Reconstruction Using Dense Visual Simultaneous Localization and Mapping Based on Unmanned Aerial Vehicle", IGARSS 2018—2018 IEEE International Geoscience and Remote Sensing Symposium, Jul. 2018, pp. 5712-5715.
Nuri Özalp et al., "Optimal UAV path planning in a 3D threat environment by using parallel evolutionary algorithms", 2013 International Conference on Unmanned Aircraft Systems (ICUAS), May 2013, pp. 308-317.
Taro Suzuki et al., "Robust UAV Position and Attitude Estimation using Multiple GNSS Receivers for Laser-based 3D Mapping", 2019 IEEE/RSJ International Conference on Intelligent Robots and Systems (IROS), Nov. 2019, pp. 4402-4408.
Kai-Wei Chiang et al., "The Development of an UAV Borne Direct Georeferenced Photogrammetric Platform for Ground Control Point Free Applications", Sensors, Jul. 4, 2012, pp. 1-21.
Helge A. Lauterbach et al., "The Eins3D project—Instantaneous UAV-Based 3D Mapping for Search and Rescue Applications", 2019 IEEE International Symposium on Safety, Security, and Rescue Robotics (SSRR), Dec. 2019, pp. 145-150.
Rupingcen Taozhang, "UAV 3D mapping with RGB-D camera", 2017 Chinese Automation Congress (CAC), Oct. 2017, pp. 2727-2731.
Abdulmajid Ansari, "Use of point cloud with a low-cost UAV system for 3D mapping", 2012 International Conference on Emerging Trends in Electrical Engineering and Energy Management (ICETEEEM), Dec. 2012, pp. 131-134.
Aurelien Yol et al., "Vision-based Absolute Localization for Unmanned Aerial Vehicles", 2014 IEEE/RSJ International Conference on Intelligent Robots and Systems, Sep. 2014, pp. 3429-3434.
Xuejiao Yan et al., "Vision-based Global Localization of Unmanned Aerial Vehicles with Street View Images", 2018 37th Chinese Control Conference (CCC), Jul. 2018, pp. 4672-4678.

* cited by examiner

DRONE APPARATUS AND METHOD FOR DEPLOYING DRONE WORKING ZONE

CROSS-REFERENCE TO RELATED APPLICATION

This application claims the priority benefit of Taiwan application no. 109138934, filed on Nov. 6, 2020. The entirety of the above-mentioned patent application is hereby incorporated by reference herein and made a part of this specification.

TECHNICAL FIELD

The disclosure relates to a drone apparatus and a control method thereof, and more particularly, relates to a drone apparatus and a method for deploying a drone working zone.

BACKGROUND

Bridge inspection is currently a manual inspection. The inspection is based on visual inspection, and an inspector needs to be as close as possible to bridge components. In places difficult for the inspector to approach (e.g., under the bridge), bridge inspection vehicles, aerial work vehicles or small boats are needed to approach the inspection zone for inspection. Due to factors such as time-consuming operations, insufficient machinery and tools and public security risks, it is difficult to improve the efficiency of the manual bridge inspection.

Using a drone to replace manpower into the bridge inspection field is a safe and economical alternative. However, since the drone relies on human control, It is not easy for the inspector to perform a close-range detection on the bridge and avoid collisions. In a traditional drone inspection, an electronic fence is used to limit an inspection range of the drone to assist the inspector in control, but the electronic fence can only be set with a fixed shape, which has its limitations in use.

FIG. 1 shows an example of a traditional method for setting a drone working zone. Referring to FIG. 1, in the traditional method for setting a working zone of a drone 1, with the center of a target object 2 as an origin O, a cylinder with a radius of r and a height of h is set and served as an electronic fence 3 so that the drone 1 is allowed to only fly within the electronic fence 3, and prohibited from flying beyond the electronic fence 3. However, since the bridge is an irregular polygon and the electronic fence can only adopt a fixed shape, the electronic fence cannot accurately fit the bridge and cannot provide sufficient accuracy when being used in the bridge inspection.

SUMMARY

An embodiment of the disclosure provides a drone apparatus, which includes an aircraft body, a communication device, a positioning device, and a flight controller coupled to the aircraft body, the communication device and the positioning device. The aircraft body is controlled to fly in a 3D space. The communication device is configured to receive a control signal. The positioning device is configured to position a position of the aircraft body in the 3D space. The flight controller is configured to: set edge rules of a working zone unit used to construct a working zone for the drone apparatus to work around a bridge; control the aircraft body to fly along a target section selected in the bridge according to the control signal, and calculate positions of multiple points of interest (POIs) passed by during the flight using the positioning device; generate one working zone unit with positions of two of the POIs according to the set edge rules of the working zone unit; and combine multiple working zone units generated by using positions of all the POIs to construct and deploy the working zone of the target section.

An embodiment of the disclosure provides a method for deploying a drone working zone, which is adapted to construct a working zone for a drone apparatus to work around a bridge. The drone apparatus includes an aircraft body, a communication device, a positioning device and a flight controller. The method includes the following steps of: setting edge rules of a working zone unit used to construct the working zone; controlling the aircraft body to fly along a target section selected in the bridge according to a control signal received by the communication device, and calculating positions of multiple points of interest (POIs) passed by during the flight using the positioning device; generating one working zone unit with positions of two of the POIs according to the set edge rules of the working zone unit; and combine multiple working zone units generated by using positions of all the POIs to construct and deploy the working zone of the target section.

An embodiment of the disclosure provides a drone apparatus, which includes an aircraft body, a communication device, a positioning device, and a flight controller coupled to the aircraft body, the communication device and the positioning device. The aircraft body is controlled to fly in a 3D space. The communication device is configured to receive a control signal. The positioning device is configured to position a position of the aircraft body in the 3D space. The flight controller is configured to: set edge rules of a working zone unit used to construct a working zone for the drone apparatus to work around a target object; control the aircraft body to fly along the target object according to the control signal, and calculate positions of multiple points of interest (POIs) passed by during the flight using the positioning device; generate one working zone unit with positions of two of the POIs according to the set edge rules of the working zone unit; and combine a plurality of working zone units generated by using positions of all the POIs so as to construct and deploy the working zone of the target object.

To make the disclosure more comprehensible, several embodiments accompanied with drawings are described in detail as follows.

DETAILED DESCRIPTION

Figure 1:
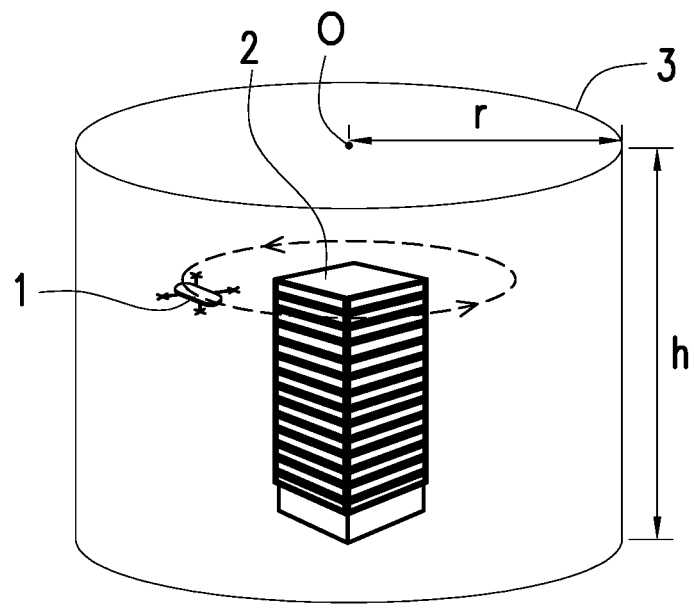
FIG. 1 shows an example of a traditional method for setting a drone working zone.
Figure 2:
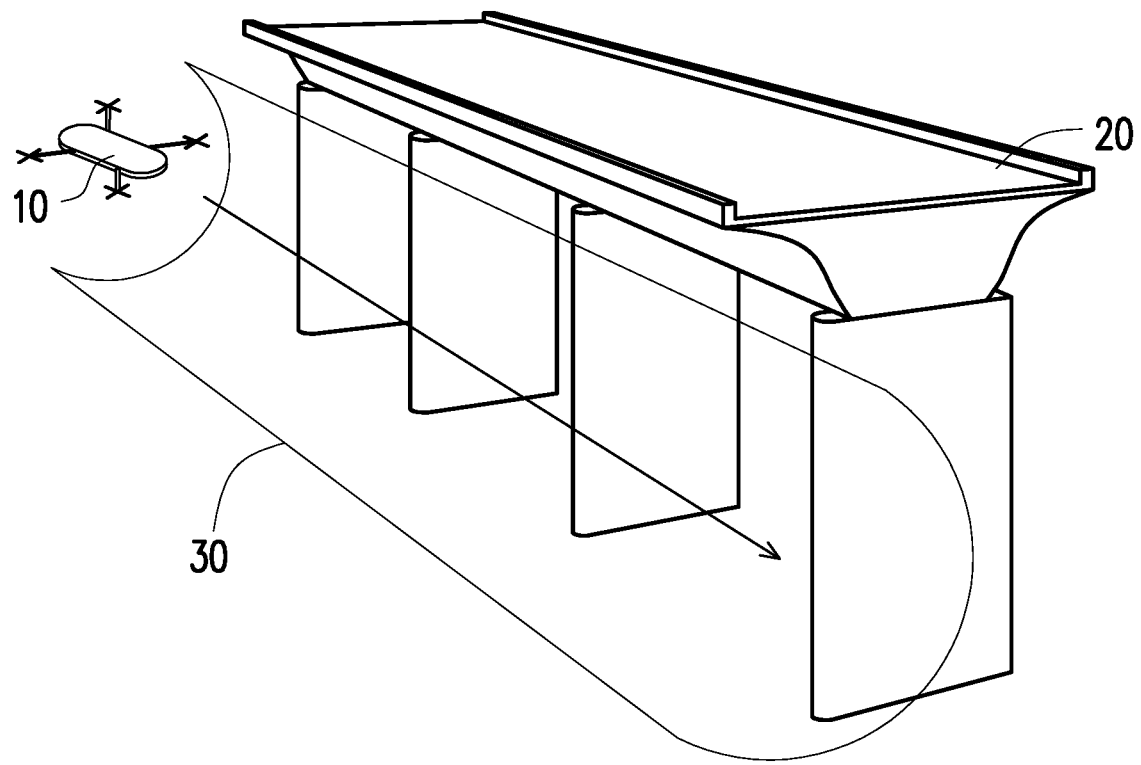
FIG. 2 is a schematic diagram of a method for deploying a drone working zone illustrated according to an embodiment of the disclosure.

FIG. 2 is a schematic diagram of a method for deploying a drone working zone illustrated according to an embodiment of the disclosure. Referring to FIG. 2, in the method of the disclosure, for example, a drone apparatus 10 flies along a target section selected in a bridge 20 automatically or under control of a professional pilot, and marks a plurality of points of interest (POIs) as a reference for constructing a working zone 30 of the drone apparatus 10 during the flight according to bridge inspection requirements. By implementing a polyhedron construction algorithm for two of the POIs, one polyhedron can be iterated as a working zone unit. By adjusting and combining the generated working zone units, the working zone 30 that fits the target section of the bridge 20 can be constructed. The constructed working zone 30 can be recorded in a flight controller of the drone apparatus 10 to help limiting a flying range of the drone apparatus 10 to accurately fit the bridge 20 for inspection when an inspector operates the drone apparatus 10 to perform inspection tasks.

Figure 3:
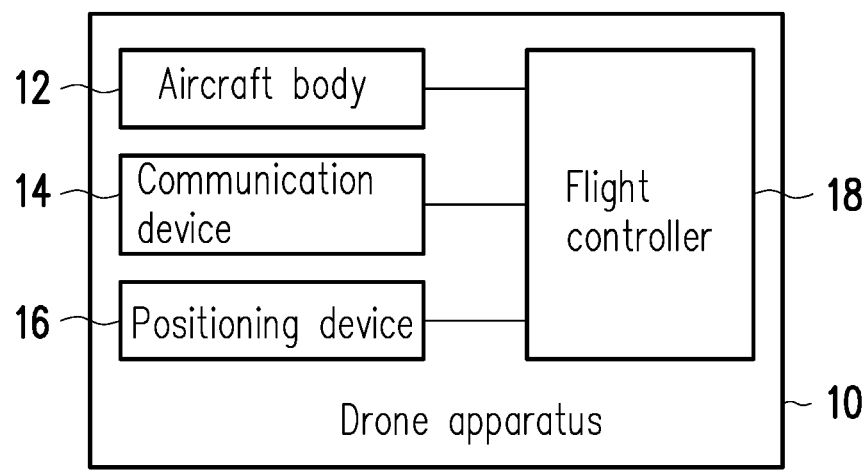
FIG. 3 is a block diagram of a drone apparatus illustrated according to an embodiment of the disclosure.

FIG. 3 is a block diagram of a drone apparatus illustrated according to an embodiment of the disclosure. Referring to FIG. 3, this embodiment illustrates the structure of the drone apparatus 10 in the embodiment of FIG. 2. The drone apparatus 10 includes an aircraft body 12 and a communication device 14, a positioning device 16 and a flight controller 18 disposed on the aircraft body 12, and their functions are described as follows.

The aircraft body 12 includes a frame and multi-axis propellers and motors disposed on the frame, which are controlled by the flight controller 18 to drive the motors to drive the propellers to generate thrust, thereby flying in a 3D space. In some embodiments, the aircraft body 12 may further include sensors such as a gyroscope, an accelerometer and a barometer to detect a flight attitude of the aircraft body 12 and assist the aircraft body 12 to fly stably.

The communication device 14 is, for example, a radio device that can support radio wave transmission and reception of different frequency bands such as 2.4G and 5.8G, or a communication device supporting a close range wireless communication standard such as Bluetooth, Wi-Fi, Zigbee, and Near Field Communication (NFC), and Device to device (D2D), which can be paired to receive wireless signals sent by electronic devices such as a smart phone and a remote control and send wireless signals to the electronic devices.

The positioning device 16 is, for example, one of a global positioning system (GPS), an ultra-wideband (UWB) positioning system, a WiFi positioning system, a Bluetooth positioning system, a light detection and ranging (LiDAR), a barometer, an ultrasonic rangefinder, an infrared rangefinder, a laser rangefinder, or a combination thereof, but not limited thereto.

Figure 4:
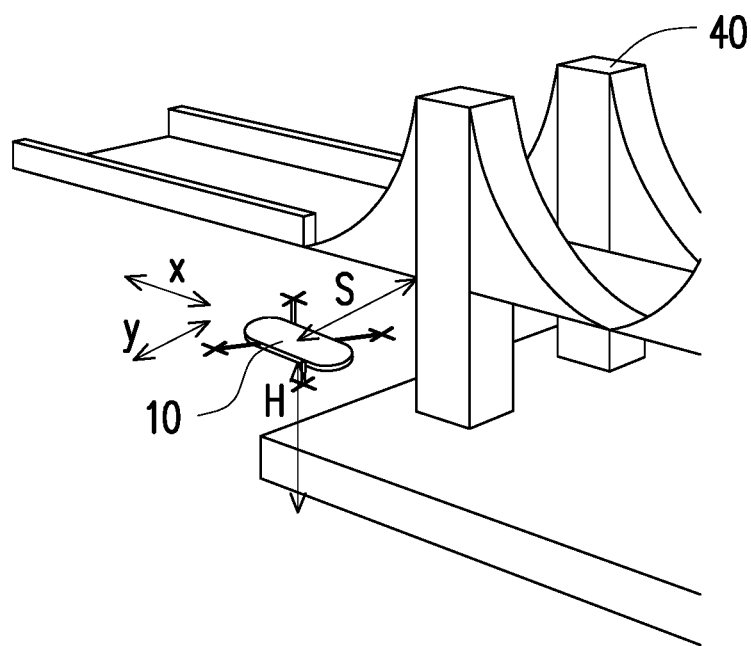
FIG. 4 is a schematic diagram of positioning a drone apparatus illustrated according to an embodiment of the disclosure.

For instance, FIG. 4 is a schematic diagram of positioning a drone apparatus illustrated according to an embodiment of the disclosure. Referring to FIG. 4 in this embodiment, the drone apparatus 10 uses, for example, GPS and UWB as main positioning modules to obtain longitude and latitude information in spatial coordinates through GPS or obtain custom coordinates through UWB (e.g., the x and y coordinates in the drawing). In addition, the drone apparatus 10 uses, for example, the LiDAR, the barometer, and the ultrasonic, infrared or laser rangefinders as auxiliary positioning modules to obtain a relative position S between the drone apparatus 10 and a target object (e.g., a bridge 40) and a height H of the drone apparatus 10 from the ground.

The flight controller 18 includes, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of above-mentioned devices. The flight controller 18 is coupled to the aircraft body 12, the communication device 14 and the positioning device 16, and configured to calculate and control the output of each axis motor in the aircraft body 12 according to a control signal received by the communication device 14, a location positioned by the positioning device 16 and sensing signals sensed by various sensors so that the drone apparatus 10 can implement various flight actions.

Figure 5:
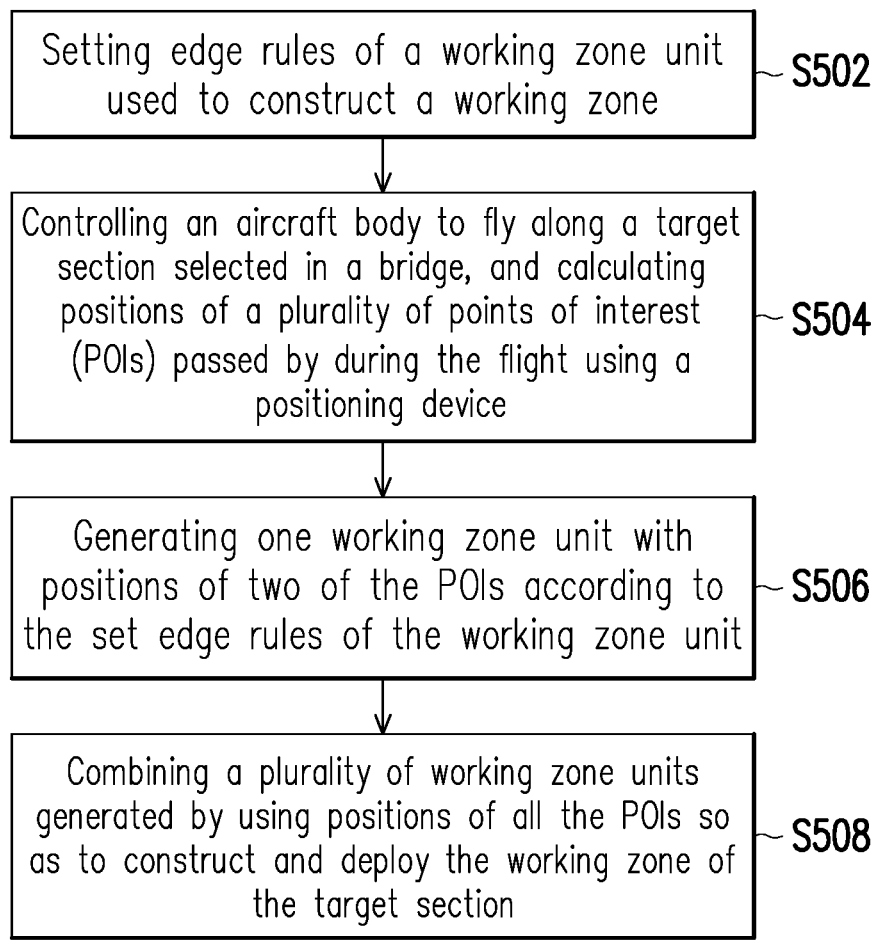
FIG. 5 is a flowchart of a method for deploying a drone working zone illustrated according to an embodiment of the disclosure.

FIG. 5 is a flowchart of a method for deploying a drone working zone illustrated according to an embodiment of the disclosure. Referring to FIG. 3 and FIG. 5 together, the method of this embodiment is adapted to the drone apparatus 10 of FIG. 3. The following detailed steps are elaborated to describe the method for deploying the drone working zone of the disclosure with the reference to each element of the drone apparatus 10.

In step S502, the flight controller 18 sets edge rules of a working zone unit used to construct a working zone. Here, the flight controller 18 receives data or commands provided by an external device (e.g., a remote control or a remote server) through, for example, the communication device 14, so as to set the edge rules. The method for setting the edge rules is not particularly limited in this embodiment.

In some embodiments, the edge rules include a shape of the working zone unit and a plurality of edge extension directions for generating the working zone unit. Here, the shape is, for example, a polyhedron with N sides, and N is a positive integer greater than or equal to 6. The edge extension directions include, for example, directions of up and down extensions, directions of left and right extensions, directions toward or away from the target object or other extension directions, which are used to generate other edges of the working zone unit through extensions from an edge formed by connecting two lattice points so as to form the working zone unit. In some embodiments, the edge rules further include an extension distance in each of the edge extension directions used to limit an edge length of the working zone unit in each of the edge extension directions to be equal to the extension distance or not exceed the extension distance. Accordingly, a length, a width, and/or a height of the working zone unit generated by extensions from different lattice points (e.g., points of interest described in the subsequent embodiments) fall within a prescribed range.

In step S504, the flight controller 18 controls the aircraft body 12 to fly along a target section selected in the bridge according to the control signal received by the communication device 14, and calculates positions of multiple points of interest (POIs) passed by during the flight using the positioning device 16. Here, the flight controller 18 captures and records the POIs in the target section during the flight of the aircraft body 12 along the target section according to, for example, a fixed flight time, a fixed flight distance or the control signal received by the communication device 14.

In an embodiment, the drone apparatus 10 is, for example, controlled by the professional pilot and flies one or more times along the target section selected in the bridge (e.g., a bottom section under the bridge between two adjacent bridge piers) to quickly construct the working zone. In an embodiment, according to various sensing signals detected by the positioning device 16, the drone apparatus 10 may also use the flight controller 18 to automatically control the aircraft body 12 to fly one or more times along the target section selected in the bridge to sequentially construct the working zone. The method for controlling the drone apparatus 10 is not particularly limited in this embodiment.

In an embodiment, the flight controller 18 automatically captures the location positioned by the positioning device 16 per the fixed flight time (e.g., 1 to 5 seconds) or per the fixed flight distance (e.g., 1 to 10 meters) during the flight, and records those locations as the positions of the POIs in the target section in a storage device (e.g., a register or a memory). In other embodiments, the flight controller 18 captures and records the location positioned by the positioning device 16 as the positions of the POIs in the target section when receiving the control signal triggered by the pilot according to bridge inspection requirements (e.g., a protruding structure of the bridge, a structure with a specific kilometer). The method for capturing the POIs is not particularly limited in this embodiment.

In some embodiments, for example, when capturing the positions of the POIs, the flight controller 18 further detects a distance between the aircraft body 12 and the bridge by using the positioning device 16, determines whether the determined distance exceeds a preset distance, and when the detected distance exceeds the preset distance, does not record a current position of the aircraft body 12 as the POI or send a prompt message to remind the pilot to fly the aircraft body 12 closer to the bridge. In this way, it is possible to avoid setting points that are too far away from the bridge as the POIs, and to ensure that the subsequently constructed working zone can fit the target section of the bridge.

In step S506, the flight controller 18 generates one working zone unit with positions of two of the POIs according to the previously set edge rules of the working zone unit. Here, the flight controller 18 generates, for example, one edge of the corresponding working zone unit according to the positions of the adjacent two of the POIs, generates other edges of the working zone unit from that edge toward each of the edge extension directions, and combines the generated edge and the other edges to form the working zone unit.

Figure 6A:
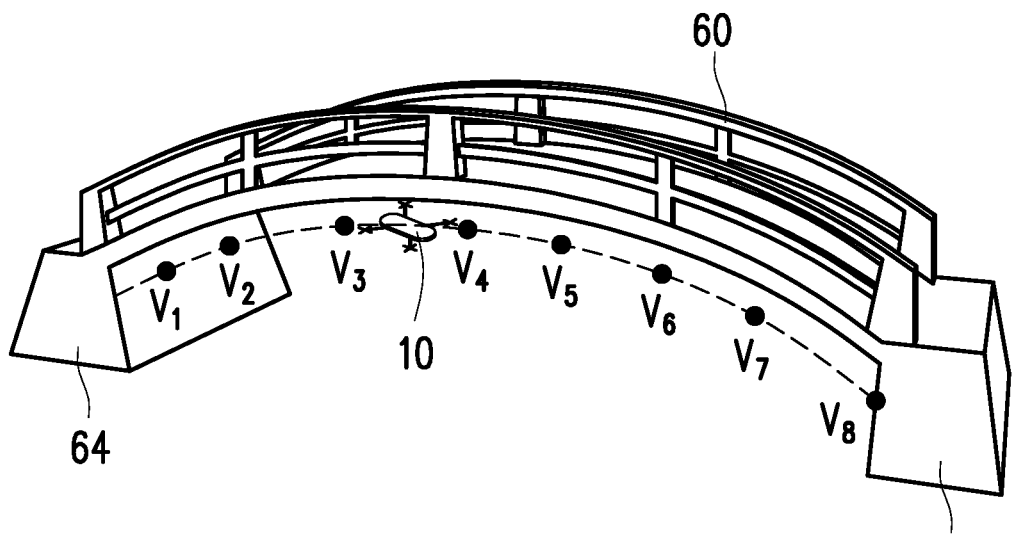
FIG. 6A to FIG. 6C show an example of forming a working zone unit according to an embodiment of the disclosure.
Figure 6B:
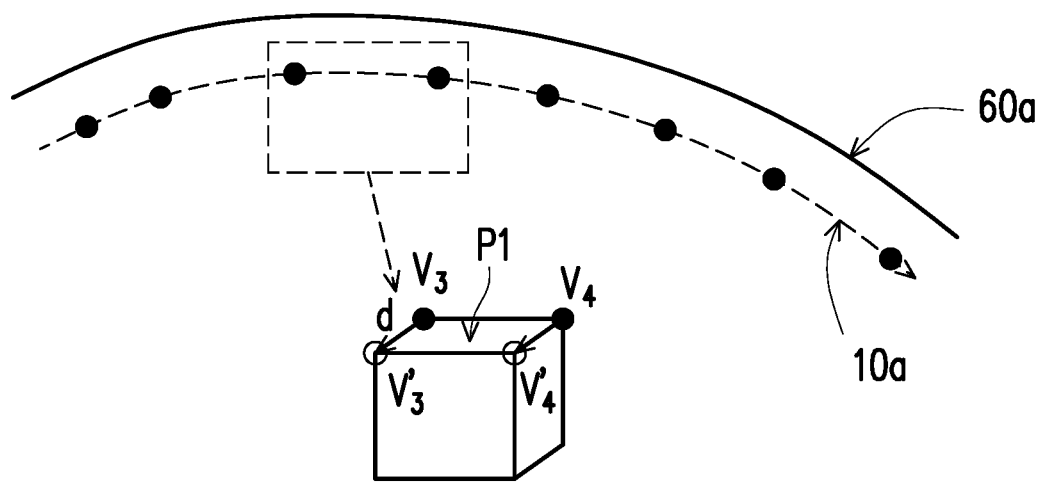
Figure 6C:
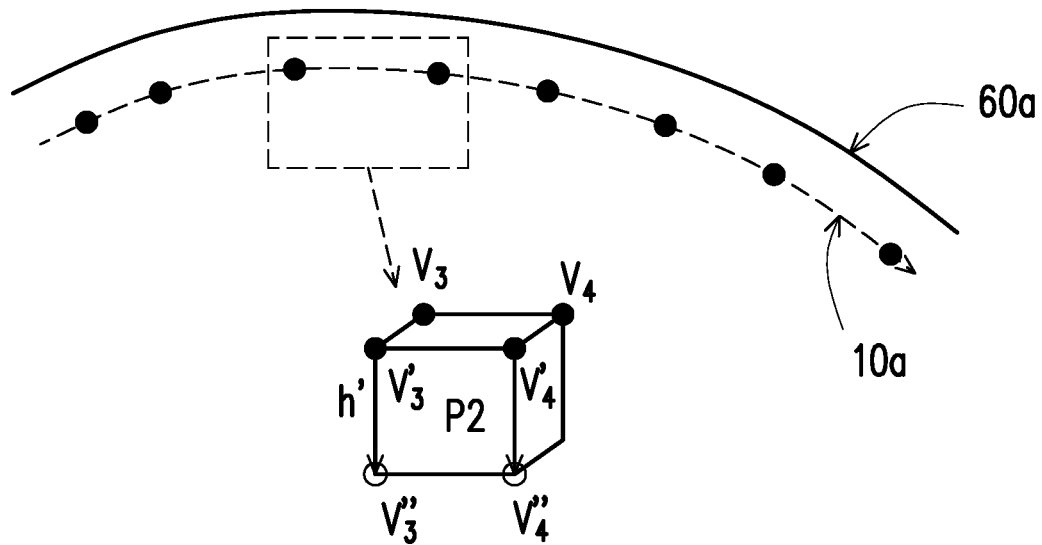

For instance, FIG. 6A to FIG. 6C show an example of forming a working zone unit according to an embodiment of the disclosure. Referring to FIG. 6A first, in this embodiment, the drone apparatus 10 is, for example, automatically controlled or controlled by the professional pilot to fly along a section under the bridge between two bridge piers 62 and 64 of a bridge 60 and capture and record a plurality of POIs $V_1$ to $V_8$ passed by during the flight according to the control signal. In FIG. 6B, a connection $\overline{V_3V_4}$ between the POIs $V_3$ and $V_4$ passed by and recorded by the drone apparatus 10 flying along a path 10a of a bridge underside 60a may be used as one edge of the working zone unit. According to the previously set edge rules, by generating another edge $\overline{V'_3V'_4}$ of the working zone unit in a horizontal extension direction, one plane of the working zone unit formed by the edges $\overline{V_3V_4}$ and $\overline{V'_3V'_4}$ can be obtained.

In detail, it is assumed that coordinates V(t) of a t-th POI among n POIs are defined as:

$$V(t) = \begin{cases} lat(t) \\ lng(t) \end{cases}, t = 1 \dots n$$

After an extension is made from the t-th POI by a distance d in an edge extension direction r, a relative point V'(t) can be obtained by a calculation formula below:

$$V'(t) = \begin{cases} lat(t) + \left(\frac{d_y}{r}\right)\left(\frac{180}{\pi}\right) \\ lng(t) + \left(\frac{d_x}{r}\right)\left(\frac{180}{\pi}\right) \Big/ \cos\left(lat(t) \cdot \frac{180}{\pi}\right) \end{cases}$$

Here, $d_x$ is an x axial vector component of the distance d between a point V and a relative point V', and $d_y$ is a y axial vector component of the distance d between the point V and the relative point V'.

With the above formula, by calculating relative points $V'_3$ and $V'_4$ of the POIs $V_3$ and $V_4$, a lattice point set $V \in \{V_3, V'_3, V_4, V'_4\}$ can be obtained.

By inputting the lattice point set V to a polygon function, one flat polygon can be generated and added as one plane P1 of a polyhedron P.

Referring to FIG. 6C, the calculated relative points $V'_3$ and $V'_4$ may be used in the above formula to obtain relative points $V''_3$ and $V''_4$ of extensions made by a distance h' in a vertical downward direction. Similarly, by inputting a lattice point set $V \in \{V'_3, V''_3, V'_4, V''_4\}$ formed by the relative points $V'_3, V'_4, V''_3$ and $V''_4$, one flat polygon may also be generated and added as another plane P2 of the polyhedron P.

In this way, by iteratively making extensions from the POIs toward different edge extension directions by a predetermined distance, different lattice point sets may be obtained for generating multiple planes of the polyhedron P. After all planes of the polyhedron P are generated, the polyhedron P may be used as a working zone unit generated by using POIs $V_3$ and $V_4$.

In an embodiment, the flight controller 18 uses this polyhedron P to, for example, limit the flight of the drone apparatus 10, so that no point on the aircraft body 12 can go beyond a range covered by the polyhedron P.

For instance, it is assumed that $u_i=(u_x, u_y)$ is coordinates of a point i on the aircraft body 12, where i=1, 2, . . . , k, the flight controller 18 can control a flight path of the aircraft body 12 so that each point i of the aircraft body 12 is located within the range of the polyhedron P:

$$\begin{cases} P_{xmin} \leq u_x \leq P_{xmax} \\ P_{xmin} \leq u_x \leq P_{xmax} \end{cases}$$

Here, $P_{xmax}$ and $P_{xmin}$ are a maximum value and a minimum value of the x coordinate of the polyhedron P, and $P_{ymax}$ and $P_{ymin}$ are a maximum value and a minimum value of the y coordinate of the polyhedron P.

Returning to the flow of FIG. 5, in step S508, the flight controller 18 combines multiple working zone units generated by using positions of all POIs so as to construct and deploy the working zone of the target section. For example, the flight controller 18 connects the corresponding working zone units according to positions of two of the POIs in communication with gaps between the working zone units to construct the working zone that is internally communicated. Then, the flight controller 18 writes the constructed working zone into its storage device (e.g., the register or the memory), and the constructed working zone can be deployed as the working zone of the drone apparatus 10 later when the bridge inspection is implemented. That is to say, the flight controller 18 may set the working zone as an electronic fence to control the flight of the aircraft body 12 so that each point on the aircraft body 12 is located within the range of the working zone without going beyond the working zone.

With the above method, the working zone (or the electronic fence) of the drone apparatus can be set as a zone that fits the bridge and meets bridge inspection requirements according to the embodiment of the invention. In this way, even if a bridge inspector is not the professional pilot, the bridge inspector can still properly control the drone apparatus to implement the bridge inspection operation without worrying about the drone apparatus colliding with the bridge or flying away from a bridge inspection zone, thereby improving the accuracy and safety of the bridge inspection.

It should be noted that in the foregoing embodiments, distances between the POIs captured by the flight controller 18 will vary due to factors like flight environments and bridge inspection requirements. If the POIs are not determined by a fixed distance or the extension distance is not preset in the edge rules, sizes of the working zone units generated by using the POIs of different distances will be different, and the working zone constructed by the working zone units of different sizes will have uneven edges. In this case, when controlling the aircraft body 12 to fly in the working zone in the future, the flight controller 18 will consume more computing resources to determine the flight path, which will also indirectly affect the flight efficiency.

In this regard, in some embodiments, the drone apparatus 10 can be controlled to enter an adjustment mode so that the flight controller 18 can determine a proper extension distance for the working zone units used to adjust the working zone units and thereby construct the working zone that is internally communicated with consistent sizes and no fluctuations.

Figure 7A:
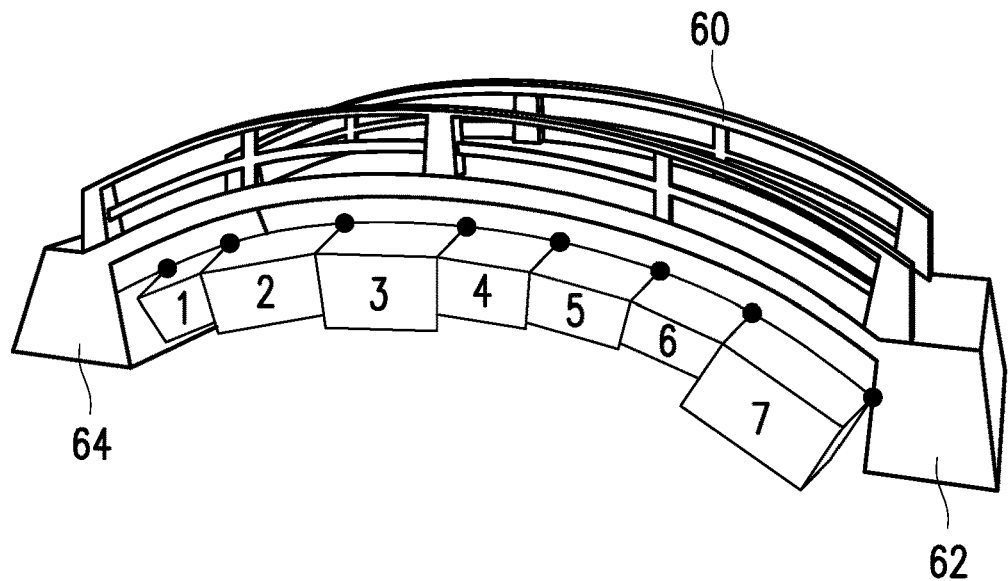
FIG. 7A to FIG. 7C show an example of adjusting a size of a working zone unit according to an embodiment of the disclosure.
Figure 7B:
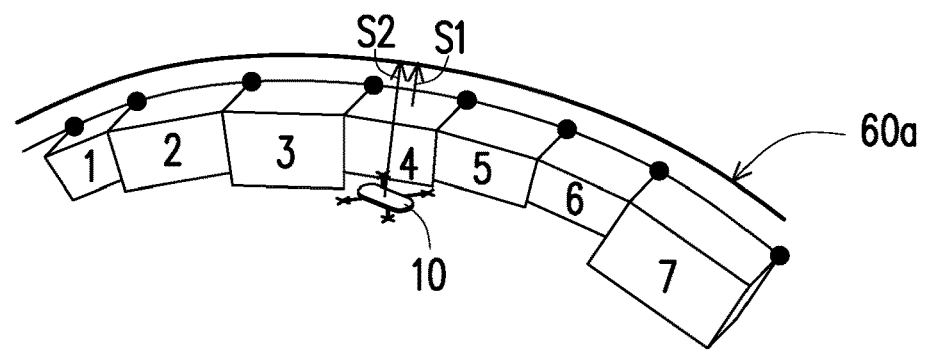
Figure 7C:
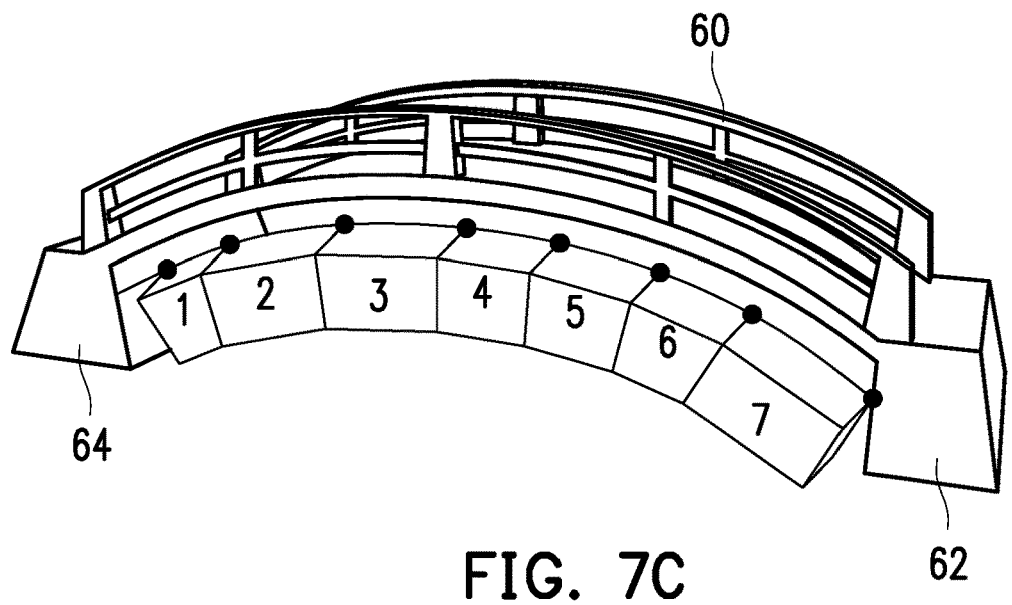

For instance, FIG. 7A to FIG. 7C show an example of adjusting a size of a working zone unit according to an embodiment of the disclosure. Referring to FIG. 7A first, this embodiment continues after the embodiments of FIG. 6A to FIG. 6C. After the flight controller 18 completes the generation of the working zone units between all the POIs $V_1$ to $V_8$, a working zone 70a including working zone units 1 to 7 may be constructed as shown in FIG. 7A. Due to inconsistent distances between the POIs $V_1$ to $V_8$, thicknesses of the generated working zone units 1 to 7 (i.e., distances in a direction away from the bridge 60) will be inconsistent. In this case, the professional pilot can control the drone apparatus 10 to fly to a target point under the bridge underside 60a as shown in FIG. 7B so that the flight controller 18 can detect a distance S2 between the target point and the bridge underside 60a, and then determine an extension distance of the working zone unit 4 in the direction away from the bridge 60 according to a distance S1 between the working zone unit 4 corresponding to a position of the target point and the bridge underside 60a (e.g., a difference between the distance S2 and the distance S1, that is, |S2−S1|). Accordingly, the thicknesses of the working zone units 1 to 3 and 5 to 7 in the direction away from the bridge 60 can be adjusted to the determined extension distance. In this way, after the flight controller 18 combines the working zone units 1 to 7 with the adjusted thicknesses, a working zone 70b that is internally communicated with consistent sizes and no fluctuations as shown in FIG. 7C can be obtained.

In some embodiments, the working zone constructed by the flight controller 18 is not limited to the bridge underside. Instead, the working zone on a lateral side of the bridge can also be constructed by controlling the aircraft body 12 to fly along the lateral side of the bridge. Moreover, in some embodiments, the flight controller 18 can combine working zones constructed for different target sections of the bridge (e.g., working zones of the bridge underside between different bridge piers), or combine the working zone constructed for the bridge underside and the working zone constructed for the lateral side of the bridge. In this way, a complete working zone of the bridge can be constructed, so that the drone apparatus 10 can be applicable for the inspection work of the entire bridge.

In some embodiments, the method for deploying the drone working zone described above is also applicable to a flight inspection on a common target object, and not limited to the bridge. In detail, the flight controller 18 can set edge rules of a working zone unit used to construct a working zone for the drone apparatus 10 to work around a target object (e.g., a building, a machine tool, a vehicle, a ship or an aircraft), and control the aircraft body 12 to fly along the target object according to the control signal received by the communication device 14. Meanwhile, positions of POIs passed by during the flight is calculated by using the positioning device 16, and then one working zone unit is generated with positions of two of the POIs according to the edge rules of the working zone unit. Lastly, multiple working zone units generated by using positions of all POIs are combined so as to construct and deploy the working zone of the target section.

In summary, in the drone apparatus and the method for deploying the drone working zone according to the embodiments of the disclosure, by controlling the drone apparatus to fly along the bridge or the target object and marking the POIs according to inspection requirements, the working zone that fits the bridge or the target object and meets the inspection requirements can be constructed. By writing this working zone into the flight controller to be deployed as the working zone for the drone apparatus to implement the inspection, the accuracy and safety of the inspection can be improved without adding additional communication or computing costs.

Although the present disclosure has been described with reference to the above embodiments, it is apparent to one of the ordinary skill in the art that modifications to the described embodiments may be made without departing from the spirit of the present disclosure. Accordingly, the scope of the present disclosure will be defined by the attached claims not by the above detailed descriptions.

The invention claimed is:
1. A drone apparatus, comprising:
an aircraft body, controlled to fly in a 3D space;
a communication device, receiving a control signal;
a positioning device, positioning a position of the aircraft body in the 3D space; and
a flight controller, coupled to the aircraft body, the communication device and the positioning device, and configured to:
set edge rules of a working zone unit used to construct a working zone for the drone apparatus to work around a bridge, wherein the edge rules comprise a shape of the working zone unit and a plurality of edge extension directions for generating the working zone unit, wherein the shape is a polyhedron with N sides, and N is a positive integer greater than or equal to 6;
control the aircraft body to fly along a target section selected in the bridge according to the control signal, and calculate positions of a plurality of points of interest (POIs) passed by during the flight using the positioning device;

generate an edge of one corresponding working zone unit with positions of two of the POIs according to the set edge rules of the working zone unit, generate a plurality of other edges of the working zone unit from the edge toward each of the edge extension directions, and combine the generated edge and the other edges to form the working zone unit; and combine a plurality of working zone units generated by using positions of all the POIs so as to construct and deploy the working zone of the target section.

2. The drone apparatus of claim 1, wherein the edge extension directions comprise directions from the POIs toward or away from the bridge.

3. The drone apparatus of claim 1, wherein the edge rules further comprise an extension distance in each of the edge extension directions.

4. The drone apparatus of claim 1, wherein the flight controller further controls the aircraft body to fly to a target point of the target section, detects a distance between the target point and the bridge, determines an extension distance of the working zone unit in a direction away from the bridge according to a distance between the working zone unit corresponding to a position of the target point and the bridge, and adjusts thicknesses of the rest of the working zone units in the direction away from the bridge to the determined extension distance.

5. The drone apparatus of claim 1, wherein the aircraft body comprises capturing and recording the POIs in the target section during the flight of the aircraft body along the target section according to a fixed flight time, a fixed flight distance or the control signal.

6. The drone apparatus of claim 5, wherein the flight controller comprises detecting a distance between the aircraft body and the bridge, determining whether the detected distance exceeds a preset distance, and when the detected distance exceeds the preset distance, not recording a current position of the aircraft body as the POI.

7. The drone apparatus of claim 1, wherein the flight controller comprises connecting the corresponding working zone units according to positions of the POIs in communication with gaps between the working zone units to construct the working zone that is internally communicated.

8. The drone apparatus of claim 1, wherein the positioning device comprises one of a global positioning system (GPS), an ultra-wideband (UWB) positioning system, a WiFi positioning system, a Bluetooth positioning system, a light detection and ranging (LiDAR), a barometer, an ultrasonic rangefinder, an infrared rangefinder, a laser rangefinder, or a combination thereof.

9. A method for deploying a drone working zone, adapted to construct a working zone for a drone apparatus to work around a bridge, the drone apparatus comprising an aircraft body, a communication device, a positioning device and a flight controller, the method comprising steps of:

setting edge rules of a working zone unit used to construct the working zone, wherein the edge rules comprise a shape of the working zone unit and a plurality of edge extension directions for generating the working zone unit, wherein the shape is a polyhedron with N sides, and N is a positive integer greater than or equal to 6;

controlling the aircraft body to fly along a target section selected in the bridge according to a control signal received by the communication device, and calculating positions of a plurality of points of interest (POIs) passed by during the flight using the positioning device;

generating an edge of one corresponding working zone unit with positions of two of the POIs according to the set edge rules of the working zone unit, generating a plurality of other edges of the working zone unit from the edge toward each of the edge extension directions, and combining the generated edge and the other edges to form the working zone unit; and combining a plurality of working zone units generated by using positions of all the POIs so as to construct and deploy the working zone of the target section.

10. The method of claim 9, wherein the edge extension directions comprise directions from the POIs toward or away from the bridge.

11. The method of claim 9, wherein the edge rules further comprise an extension distance in each of the edge extension directions.

12. The method of claim 9, wherein after generating the edge of the corresponding working zone unit according to the positions of two of the POIs, the method further comprises:

controlling the aircraft body to fly to a target point of the target section;

detecting a distance between the target point and the bridge, and determining an extension distance of the working zone unit in a direction away from the bridge according to a distance between the working zone unit corresponding to a position of the target point and the bridge; and adjusting thicknesses of the rest of the working zone units in the direction away from the bridge to the determined extension distance.

13. The method of claim 9, wherein the aircraft body comprises capturing and recording the POIs in the target section during the flight of the aircraft body along the target section according to a fixed flight time, a fixed flight distance or the control signal.

14. The method of claim 13, wherein the step of capturing and recording the POIs in the target section further comprises:

detecting a distance between the aircraft body and the bridge, and determining whether the detected distance exceeds a preset distance; and if the detected distance exceeds the preset distance, not recording a current position of the aircraft body as the POI.

15. The method of claim 9, wherein the step of combining the working zone units generated by using the positions of all the POIs so as to construct and deploy the working zone of the target section comprises:

connecting the corresponding working zone units according to positions of the POIs in communication with gaps between the working zone units to construct the working zone that is internally communicated.

16. A drone apparatus, comprising:

an aircraft body, controlled to fly in a 3D space;

a communication device, receiving a control signal;

a positioning device, positioning a position of the aircraft body in the 3D space; and a flight controller, coupled to the aircraft body, the communication device and the positioning device, and configured to:

set edge rules of a working zone unit used to construct a working zone for the drone apparatus to work around a target object, wherein the edge rules comprise a shape of the working zone unit and a plurality of edge extension directions for generating the working zone unit, wherein the shape is a polyhedron with N sides, and N is a positive integer greater than or equal to 6;

control the aircraft body to fly along the target object according to the control signal, and calculate positions of a plurality of points of interest (POIs) passed by during the flight using the positioning device;

generate an edge of one corresponding working zone unit with positions of two of the POIs according to the set edge rules of the working zone unit, generating a plurality of other edges of the working zone unit from the edge toward each of the edge extension directions, and combining the generated edge and the other edges to form the working zone unit; and combine a plurality of working zone units generated by using positions of all the POIs so as to construct and deploy the working zone of the target object.

\* \* \* \* \*